No. 679,323. Patented July 30, 1901.
L. P. MORIN.
HEN'S NEST.
(Application filed Mar. 28, 1901.)
(No Model.)

Witnesses:
J. F. Groat.
H. J. Beruloff

Louis Paul Morin, Inventor
By Marion & Marion
Attorneys

UNITED STATES PATENT OFFICE.

LOUIS PAUL MORIN, OF ST. HYACINTHE, CANADA.

HEN'S NEST.

SPECIFICATION forming part of Letters Patent No. 679,323, dated July 30, 1901.

Application filed March 28, 1901. Serial No. 53,241. (No model.)

*To all whom it may concern:*

Be it known that I, LOUIS PAUL MORIN, a subject of the King of Great Britain, residing at St. Hyacinthe, county of St. Hyacinthe, Province of Quebec, Canada, have invented certain new and useful Improvements in Hens' Nests; and I do hereby declare that the following is a full, clear, and exact description of the invention, such as will enable others skilled in the art to which it appertains to make and use the same.

My invention relates to improvements in hens' nests; and one object in view is to provide a construction arranged to discharge a freshly-laid egg from beneath a hen into a separate compartment which is readily accessible to the hand, so that the eggs can be removed without disturbing the occupant of the nest.

Further objects are to provide means arranged in the path of an egg in the act of rolling from the nest and adapted to check the same temporarily, so as to prevent breakage of the egg, to prevent egg-eating hens from eating the eggs, to provide a soft or yieldable bottom for supporting the eggs, and arranged to minimize the danger of breakage when the eggs are discharged from the nest, to simplify the construction, and to reduce the cost of manufacture.

With these ends in view the invention consists in the novel construction and arrangement of parts, which will be hereinafter fully described and claimed.

Figure 1:
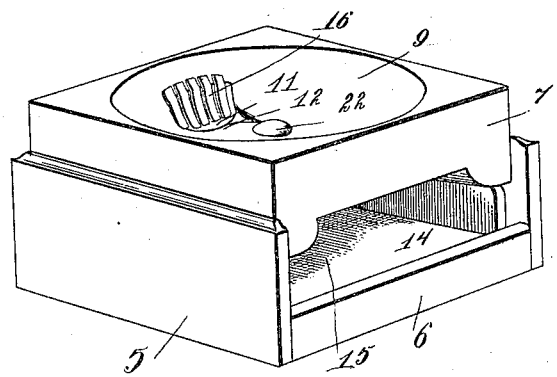
Figure 2:
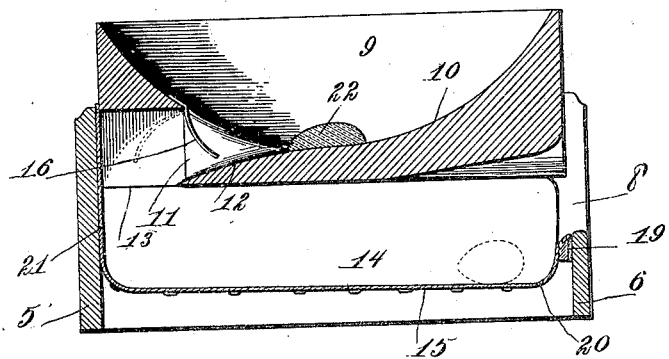
Figure 3:
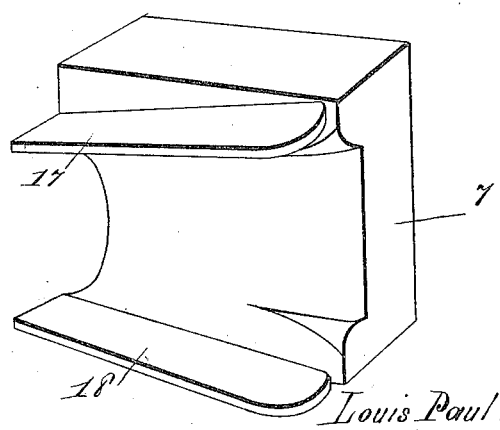

In the drawings hereto annexed, forming a part of this specification, Figure 1 is a perspective view of a hen's nest embodying my improvements. Fig. 2 is a vertical sectional elevation taken centrally through the nest in the direction of its length. Fig. 3 is a detail perspective view of the nest-frame removed from the base-frame and partly inverted, so as to show the under side of the nest-frame and the converging tapered flanges thereon.

The same numerals of reference denote like parts in all the figures of the drawings.

5 designates a base-frame, which is provided at its front side with a short cross-rail 6. The nest-frame 7 fits snugly within the upper portion of this base-frame, so as to have the front end of the nest-frame terminate at a suitable distance above the cross-rail, thereby forming a hand-opening 8 between the bottom side of the nest-frame and the top edge of the cross-rail. The nest-frame may be constructed in any suitable way, so as to form the nest chamber or space 9, the bottom 10 of which is curved and arranged to incline downwardly toward the back side of the nest. The rear portion of this nest-frame is formed with a discharge-passage 11, having the sloping bottom 12, as shown by Fig. 2, said discharge-passage opening through the bottom of the nest, as at 13 in Fig. 2, whereby the passage 11 establishes communication from the nest-chamber 9 with the storage-chamber 14, the latter being formed by the nest-frame 7 and by the flexible bottom 15. Across the throat or opening of the discharge-passage 11 from the nest-chamber 9 is arranged a series of retarding-fingers 16, the same being secured at their upper ends to the nest-frame at the top edge of the discharge-passage. Any suitable number of these fingers may be employed, and said fingers are made of elastic or other resilient material, such as spring metal, whereby the fingers are adapted to yield or give in a backward direction, as indicated by dotted lines in Fig. 2. The elasticity of the fingers makes them assume a position across the mouth of the passage 11, so that said fingers will be interposed in the path of an egg, which may roll along the bottom 10 of the nest-chamber and the bottom 12 of the discharge-passage, whereby the egg is checked or retarded by engagement with the fingers 16. The weight of the egg, however, is sufficient to force these fingers in a backward direction and to assume the dotted-line position of Fig. 2, whereby the egg will roll through the passage 11 and drop upon the flexible bottom 15. The nest-frame 7 is provided on its bottom with the flanges 17 18, the same depending for a suitable distance below the bottom of said nest-frame. These flanges are not disposed in parallel positions nor are they of uniform depth throughout their length. The flanges converge from the rear portion of the nest and base frames toward the hand-opening 8 at the front of the structure, and, furthermore, each flange is tapered longitudinally—that is to say, the widest part of the flange is at the rear, while the narrowest part thereof is at the front of the nest. The flexible bottom 15 may consist of a piece of stout fabric, such as canvas, which is fastened to the rear of the nest-frame, as shown by Fig. 2, is arranged to extend along and in engagement with the lower edges of the flanges 17 18, and which has its front edge attached at 19 to a cross-rail 6 of the base-frame. The flexible bottom 15 is unsupported at points between its attachment to the base and nest frames, and it is stretched along the lower edges of the tapered flanges 17 18. This disposition of the flexible bottom with reference to the flanges makes the bottom incline somewhat from the rear of the nest toward the front thereof, as will be evident by an inspection of Fig. 2; but the front portion of this flexible bottom is curved or extended upwardly, as indicated at 20, in order to afford a ledge which will serve as a stop for the eggs and prevent them from rolling through the opening 8. By fastening the upturned rear edge portion 21 of the flexible bottom to the nest-frame the latter is adapted to be fitted snugly into the base-frame and to be held in place by the frictional engagement of the flexible bottom with the rear of the base-frame, and at the same time said flexible bottom is stretched or held in a comparatively taut condition and is also inclined toward the front of the base-frame, the bottom of the nest-chamber having a rearward inclination or curve.

From the foregoing description, taken in connection with the drawings, it will be seen that an egg is free to roll from the nest-chamber through the passage 11 and into the storage-chamber 14. During the progress of the egg it will be temporarily checked by engagement with the yieldable fingers 16, and which will drop upon the stretched and flexible bottom, whereby the egg may be discharged from the nest-chamber without breakage. Furthermore, the hand can easily be passed through the opening 8 for the purpose of removing the eggs from the chamber 14 without disturbing the occupant of the nest.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

A nest-egg 22 may be secured to the bottom of the nest-chamber 9; but as this is an obvious expedient I have not considered it necessary to describe the same.

Having thus described my invention, what I claim as new is—

1. A nest provided with a laterally and downwardly extending discharge-passage, a storage-compartment below said nest and the passage and having a hand-opening, and a flexible bottom stretched in said compartment and arranged to incline toward the hand-opening thereof, substantially as described.

2. The combination of a base-frame, a nest fitted thereto and forming a hand-opening therewith and provided with a discharge-passage and with depending flanges, a stretched flexible bottom engaging with said flanges and inclined toward a hand-opening in the nest, and yieldable fingers extending across said passage, substantially as described.

In witness whereof I have hereunto set my hand in the presence of two witnesses.

LOUIS PAUL MORIN.

Witnesses:
J. T. MOLLEUR,
FRK. LANGELIER.